United States Patent
Oguri et al.

(10) Patent No.: US 7,458,912 B2
(45) Date of Patent: Dec. 2, 2008

(54) AUTOMATIC TRANSMISSION

(75) Inventors: Kazuo Oguri, Hiroshima (JP); Hideo Kawamatsu, Hiroshima (JP)

(73) Assignee: Jatco Ltd, Shizuoka (JP)

( * ) Notice: Subject to any disclaimer, the term of this patent is extended or adjusted under 35 U.S.C. 154(b) by 380 days.

(21) Appl. No.: 11/440,012

(22) Filed: May 25, 2006

(65) Prior Publication Data

US 2006/0270514 A1    Nov. 30, 2006

(30) Foreign Application Priority Data

May 25, 2005 (JP) ............................. 2005-152272

(51) Int. Cl.
F16H 3/62 (2006.01)
(52) U.S. Cl. ..................................... 475/275
(58) Field of Classification Search .................. 475/5, 475/275

See application file for complete search history.

(56) References Cited

U.S. PATENT DOCUMENTS

| | | | |
|---|---|---|---|
| 5,938,559 A | 8/1999 | Sumi | |
| 6,811,512 B2 * | 11/2004 | Usoro et al. | 475/276 |
| 7,128,683 B2 * | 10/2006 | Oguri et al. | 475/276 |
| 7,163,484 B2 * | 1/2007 | Klemen | 475/276 |
| 7,318,787 B2 * | 1/2008 | Tabata et al. | 477/3 |
| 7,337,051 B2 * | 2/2008 | Ota et al. | 701/51 |
| 7,364,527 B2 * | 4/2008 | Klemen | 475/290 |
| 7,384,364 B2 * | 6/2008 | Jang | 475/275 |

FOREIGN PATENT DOCUMENTS

JP       10-030688 A       2/1998

* cited by examiner

*Primary Examiner*—Ha D. Ho
(74) *Attorney, Agent, or Firm*—Foley & Lardner LLP

(57) ABSTRACT

An automatic transmission includes a planetary gear train of first, second, third and fourth planetary gears; an input rotation member connected with a ring gear of the second planetary gear; and a first connection member connecting a carrier of the second planetary gear and a ring gear of the fourth planetary gear. A first rotation sensor senses the rotation speed of the first connection member. A second rotation sensor senses the rotation speed of one rotating element of the first and second planetary gears. A processing section calculates an input speed of the automatic transmission from the rotation speeds sensed by the first and second rotation sensors.

14 Claims, 6 Drawing Sheets

|  | B1 | C1 | C2 | C3 | B5 | B2 | B3 | B4 | F1 | F3 | F2 |
|---|---|---|---|---|---|---|---|---|---|---|---|
| 1st | O |  |  | O | O | O |  |  | (O) | (O) | (O) |
| 2nd |  |  |  | O | O | O | O |  |  | (O) | (O) |
| 3rd |  |  | O |  | O | O | O |  |  | (O) |  |
| 4th |  |  | O | O |  |  | O |  |  |  |  |
| 5th |  | O | O | O |  |  |  |  |  |  |  |
| 6th |  | O |  | O |  |  | O |  |  |  |  |
| 7th | O | O |  | O |  |  |  |  | (O) |  |  |
| Rev. | O |  |  | O |  |  |  | O |  |  |  |

FIG.4A

| GEAR RATIO | | STEP RATIO | |
|---|---|---|---|
| 1ST | 4.6837 | 1ST/2ND | 1.5305 |
| 2ND | 3.0602 | 2ND/3RD | 1.5179 |
| 3RD | 2.0161 | 3RD/4TH | 1.4516 |
| 4TH | 1.3889 | 4TH/5TH | 1.3889 |
| 5TH | 1.0000 | 5TH/6TH | 1.1682 |
| 6TH | 0.8560 | 6TH/7TH | 1.1283 |
| 7TH | 0.7588 | | |
| REV | 3.5384 | 1ST/7TH | 6.1738 |
| α1 | 0.5278 | 1ST/REV | 0.7555 |
| α2 | 0.3889 | | |
| α3 | 0.4516 | | |
| α4 | 0.5179 | | |

FIG.4B

| GEAR RATIO | | STEP RATIO | |
|---|---|---|---|
| 1ST | 5.6813 | 1ST/2ND | 1.6047 |
| 2ND | 3.5403 | 2ND/3RD | 1.5836 |
| 3RD | 2.2642 | 3RD/4TH | 1.5385 |
| 4TH | 1.4717 | 4TH/5TH | 1.4717 |
| 5TH | 1.0000 | 5TH/6TH | 1.1991 |
| 6TH | 0.8340 | 6TH/7TH | 1.1326 |
| 7TH | 0.7363 | | |
| REV | 3.8028 | 1ST/7TH | 7.7158 |
| α1 | 0.5300 | 1ST/REV | 0.6694 |
| α2 | 0.4717 | | |
| α3 | 0.5385 | | |
| α4 | 0.5636 | | |

FIG.4C

| GEAR RATIO | | STEP RATIO | |
|---|---|---|---|
| 1ST | 6.3508 | 1ST/2ND | 1.6531 |
| 2ND | 3.8417 | 2ND/3RD | 1.6327 |
| 3RD | 2.3530 | 3RD/4TH | 1.5385 |
| 4TH | 1.5294 | 4TH/5TH | 1.5294 |
| 5TH | 1.0000 | 5TH/6TH | 1.1915 |
| 6TH | 0.8393 | 6TH/7TH | 1.1199 |
| 7TH | 0.7494 | | |
| REV | 4.5702 | 1ST/7TH | 8.4745 |
| α1 | 0.5300 | 1ST/REV | 0.7196 |
| α2 | 0.5294 | | |
| α3 | 0.5385 | | |
| α4 | 0.6327 | | |

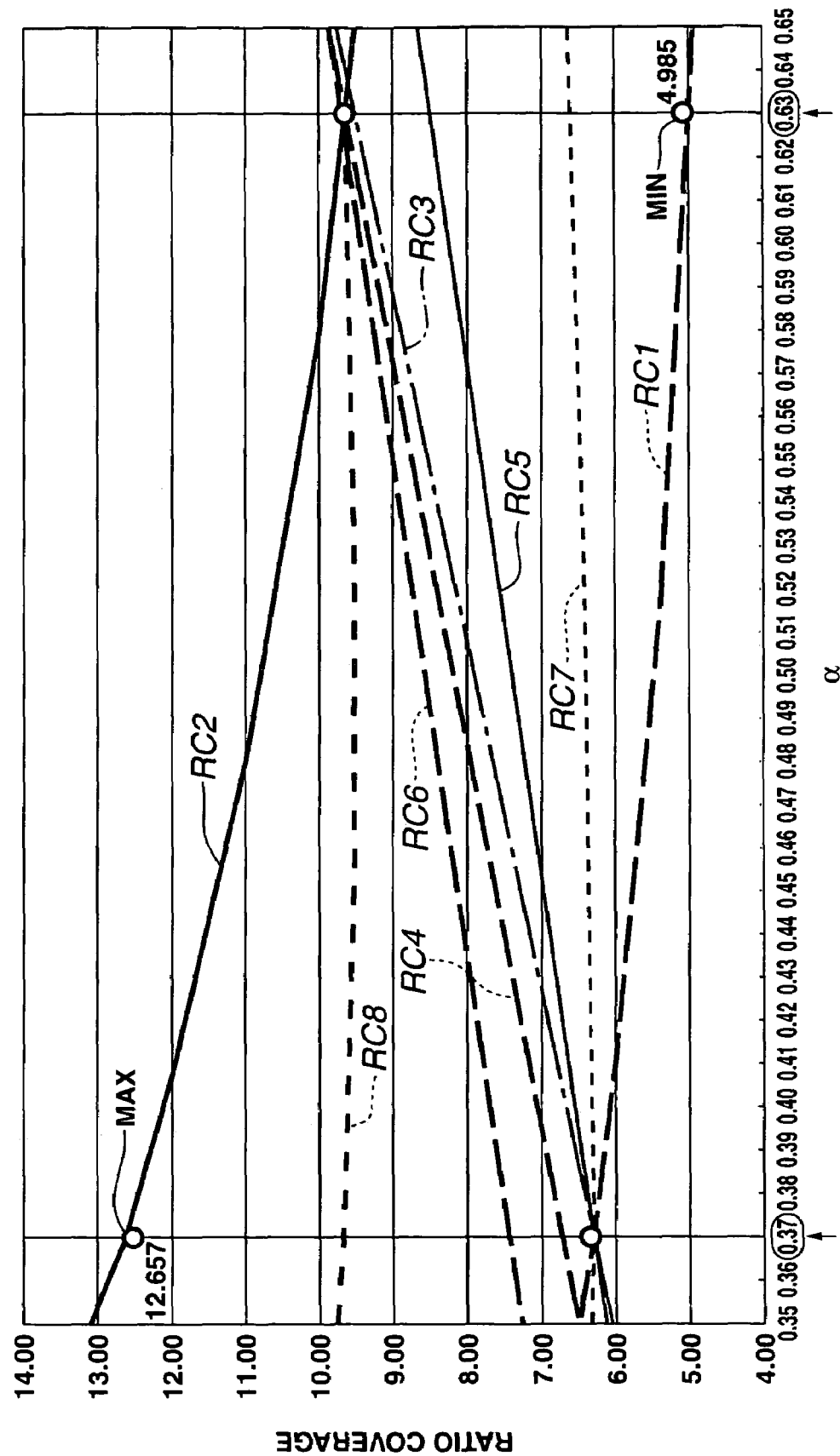

AUTOMATIC TRANSMISSION

BACKGROUND OF THE INVENTION

The present invention relates to an automatic transmission, and more specifically to an automatic transmission arranged to sense an input speed.

Recently, an automatic transmission is arranged to improve the quality of shift control by sensing the input rotation speed and the output rotation speed, and examining the gear ratio accurately during the process of shifting.

U.S. Pat. No. 5,938,559 (≈JP10030688 A) discloses an automatic transmission including three planetary gears for providing five forward speeds and one reverse speed. In this transmission, the input shaft is located at the center, and enclosed by a rotating member, so that the direct detection of the input rotation speed is not easy.

SUMMARY OF THE INVENTION

It is an object of the present invention to provide an automatic transmission for increasing the number of speeds of the transmission, and enabling the detection of input speed.

According to one aspect of the present invention, an automatic transmission comprises: a planetary gear train including first, second, third and fourth planetary gears arranged in order of mention from an input shaft's side toward an output shaft's side, the first and second planetary gears being combined to form a planetary gear set in which two of three rotating elements of the first planetary gear are connected, respectively, with two of three rotating elements of the second planetary gear; an input rotation member which extends from an input shaft radially outwards between the second and third planetary gears and which is connected with a ring gear of the second planetary gear; a first connection member including a first end portion connected with a carrier of the second planetary gear between the first and second planetary gears, a second end portion connected with a ring gear of the fourth planetary gear, and an intermediate portion surrounding the second and third planetary gears; an engaging device group to determine a gear ratio of the planetary gear train; a first rotation sensor to sense a rotation speed of a first rotary member which is the first connection member; a second rotation sensor to sense a rotating speed of a second rotary member which is a rotating element of the planetary gear set and which is arranged to rotate at a speed different from the rotating speed of the first connection member; and a processing section to calculate an input speed of the input shaft from the rotating speeds sensed by the first and second rotation sensors.

According to another aspect of the invention, an automatic transmission comprises: a planetary gear train including first, second, third and fourth planetary gears, the second and third planetary gears being located axially between the first and fourth planetary gears, the second planetary gear being located axially between the first and third planetary gears; an input shaft which is enclosed by the first planetary gear and which is connected with a ring gear of the second planetary gear member by an input rotation member extending between the second and third planetary gears; a first connection member including a first end portion connected with a carrier of the second planetary gear between the first and second planetary gears, a second end portion connected with a ring gear of the fourth planetary gear, and an intermediate portion surrounding the second and third planetary gears; a first rotation sensor to sense a rotation speed of the first connection member; a second rotation sensor to sense a rotating speed of a carrier of the first planetary gear; and a processing section to calculate an input speed of the input shaft from the rotating speeds sensed by the first and second rotation sensors.

BRIEF DESCRIPTION OF THE DRAWINGS

FIGS. 4A, 4B and 4C are tables showing numerical examples of the gear ratios achieved in the automatic transmission according to this embodiment.

FIG. 5 is a graph illustrating a ratio coverage in the automatic transmission according to this embodiment.

DETAILED DESCRIPTION OF THE INVENTION

Figure 8:
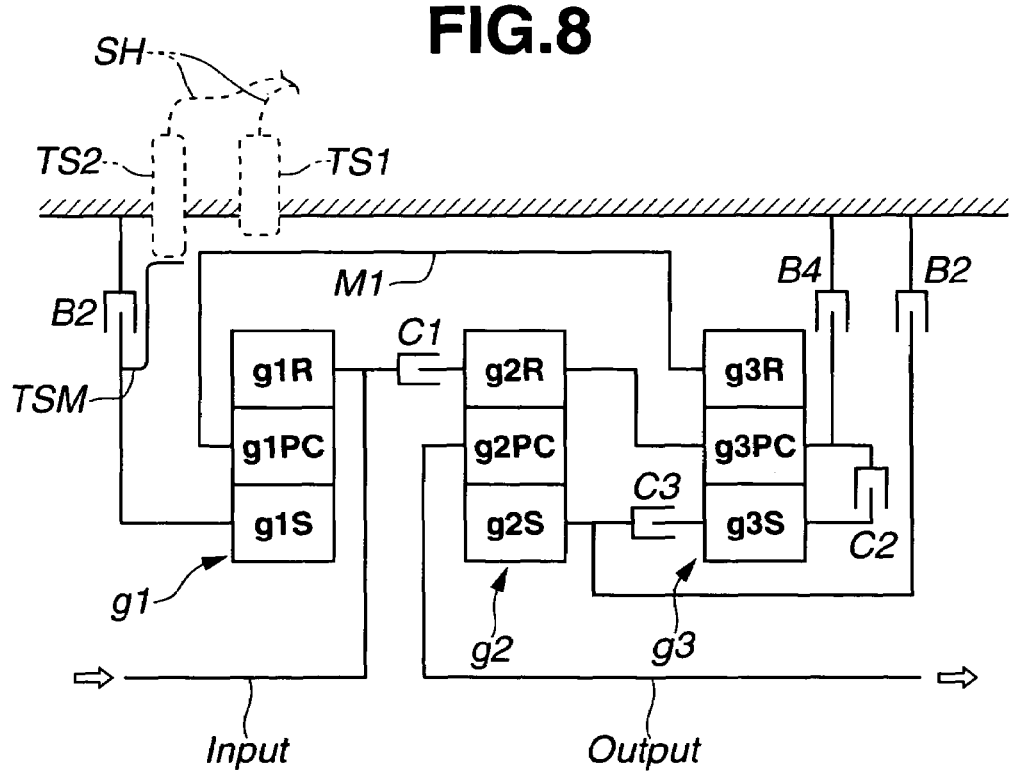
FIG. 8 is a skeleton view showing an automatic transmission in a comparative example

FIG. 8 shows an automatic transmission of a comparative example to facilitate understanding of the present invention. The automatic transmission shown in FIG. 8 includes three planetary gears (or planetary gear units) g1, g2 and g3 like the automatic transmission disclosed in the above-mentioned U.S. Pat. No. 5,938,559. An input shaft Input is inserted from the left side (input side), and connected with a first ring gear g1R of first planetary gear g1 through an input connection member or input rotation member extending from the input shaft Input radially outwards between first and second planetary gears g1 and g2. A first connection member M1 surrounds the first and second planetary gears g1 and g2 to connect a first planet carrier g1PC and a third ring gear g3R. Thus, first and second planetary gears g1 and g2 as well as input shaft Input are enclosed and covered by first connection member M1.

Figure 7:
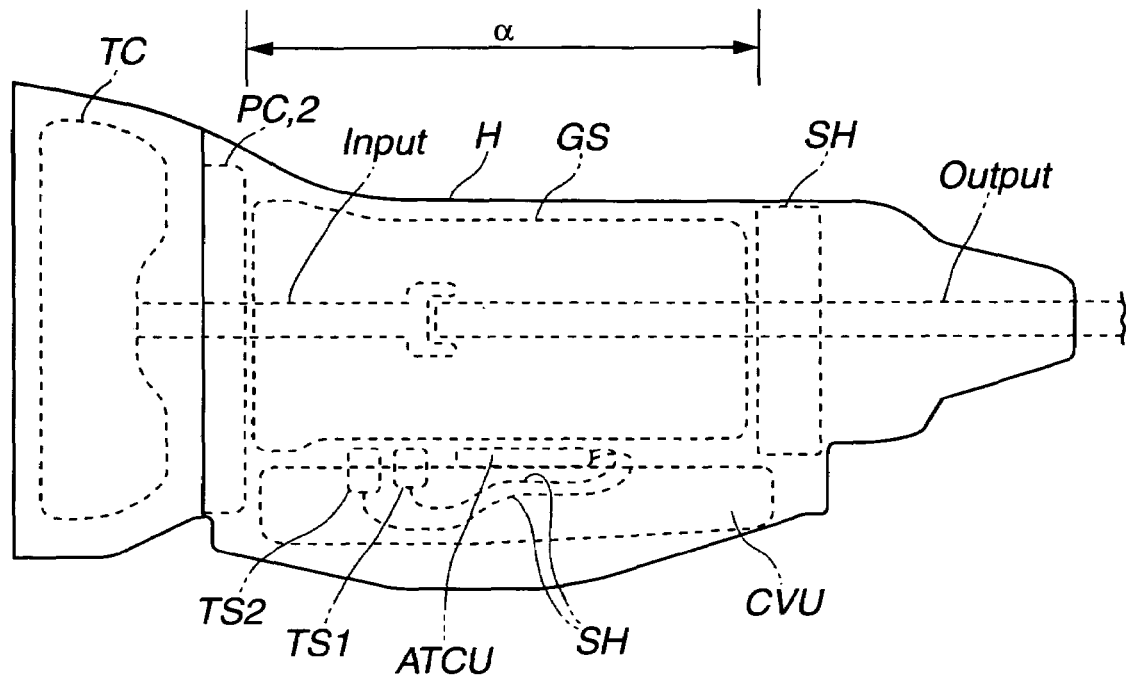
FIG. 7 is a schematic view showing the layout employed in the automatic transmission according to this embodiment.

In this automatic transmission, it is not easy to determine the position of a turbine sensor for sensing the input shaft speed. FIG. 7 schematically shows the layout which can be employed by the automatic transmission of FIG. 8. Input shaft Input connected with a torque converter TC extends through a pump cover PC (2), into a planetary gear system or train GS. An output shaft Output aligned with input shaft Input extends through a stator housing SH to the right side. The planetary gear train GS receives an input rotation from input shaft Input, and delivers an output rotation through output shaft Output at a proper gear ratio. A control valve unit CVU for producing various hydraulic control pressures for controlling the automatic transmission is disposed under the planetary gear train GS. An electronic controller ATCU for controlling the automatic transmission is disposed between the planetary gear train GS on the upper side and the control valve unit CVU on the lower side. The planetary gear train GS, control valve unit CVU and controller ATCU are thus integrated into a unit, and enclosed by a transmission housing H. In the automatic transmission having such an electro-mechanical integrated structure, it is desirable to dispose a turbine sensor (TS1 and TS2) within a region α axially between pump cover PC and stator housing SH, as shown in FIG. 7, in order to facilitate the connection between the turbine sensor and controller ATCU by sensor harness SH of the turbine sensor.

However, input shaft Input is located at the center of the automatic transmission, and the rotating members rotating at the same speed as input member Input are covered by first connection member M1. Therefore, it is practically impossible to sense the input speed of input shaft Input directly. Therefore, in one conceivable arrangement, the input speed is determined by calculation from signals from two rotation sensors TS1 and TS2. In the example shown in FIG. 8, first rotation sensor TS1 is arranged to sense the rotation speed N(PC) of first carrier g1PC, and second rotation sensor TS2 is arranged to sense the rotation speed N(S) of first sun gear g1S by sensing the rotation of a sensor member TSM connected with sun gear g1S. When the gear ratio of sun gear g1S and carrier g1PC is one, and the gear ratio of carrier g1PC and ring gear g1R is α, the rotation speed N(R) of ring gear g1R connected with the input shaft Input is calculated by using the following equation.

$$N(R)=(1+\alpha)N(PC)-\alpha N(S)$$

Recently, there is a demand for increasing the number of speeds of an automatic transmission beyond the five forward speeds and one reverse speed since, in order to improve the fuel consumption and to achieve optimum performance in a variety of driving situations, it is required to control the output toque of an engine in accordance with a relation between optimum speed and torque. When a further planetary gear is added to the planetary gear train shown in FIG. 8 to meet this demand, the disposition of the turbine sensor or rotation sensor is problematic.

If an additional planetary gear is provided on the left (input) side of the planetary gear train of g1, g2 and g3 shown in FIG. 8, it becomes difficult to sense the rotation of the first sun gear g1S because the existence of the additional planetary gear on the left side of planetary gear g1 makes it difficult to form a takeout path to taking out rotation of the sun gear g1S to the radial outer side.

The sun gear g1S must be connected through a brake B2 to the transmission housing H. Therefore, if the additional planetary gear is provided on the left side of this path between sun gear g1S and housing H, it is practically impossible to connect the additional planetary gear with rotating elements other than the sun gear g1S, so that this arrangement is inadequate for adding desirable gear speeds.

If the additional planetary gear is disposed between the first planetary gear g1 and the path between the sun gear g1S and transmission housing H through brake B2, then a rotation member of the sun gear g1S is located radially inside the additional planetary gear, so that it is difficult to form a takeout path to take out rotation of the sun gear g1S to the radial outer side. Moreover, in this case, it is possible to employ a turbine sensor extending axially through the pump cover PC. However, the pump cover 2 must support input shat Input, and serve as a reaction member for receiving a reactive force of another engaging device. Therefore, it is not desirable to open a through hole in pump cover for inserting the turbine sensor. Moreover, the pump cover 2 functions to separate a dry chamber requiring no lubrication on the torque converter's side (that is, the left side as viewed in FIG. 7) and a wet chamber requiring lubrication on the planetary gear train's side (that is, the right side in FIG. 7). Therefore, the through hole for the turbine sensor requires the addition of a seal, so that the number of parts is increased. Moreover, in the case of the electro-mechanical integrated structure, if the first and second rotation sensors TS1 and TS2 are spaced apart, this arrangement makes it difficult to arrange the harnesses, and tends to make complicated the assembly operation.

Figures 1, 2:
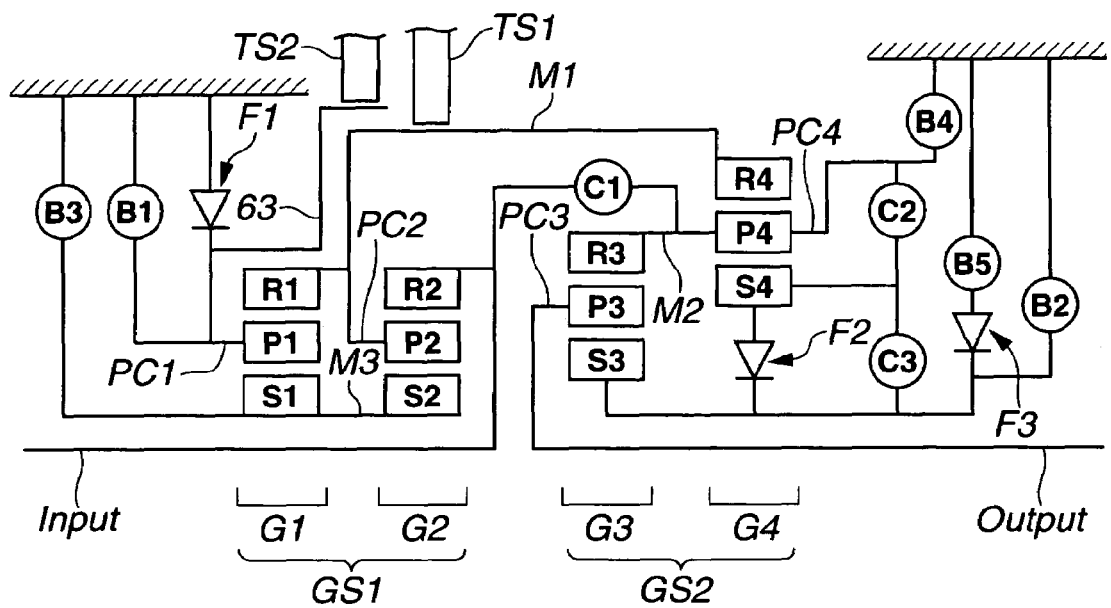
FIG. 1 is a skeleton view showing an automatic transmission according to one embodiment of the present invention.
FIG. 2 is an engagement table showing engagement states of engaging devices in the automatic transmission of FIG. 1 to achieve seven forward speeds and one reverse speed.

FIG. 1 shows, in the form of a skeleton view, an automatic transmission according to one embodiment of the present invention devised in view of the above-mentioned problems. The automatic transmission of this example is an FR type transmission providing seven forward speeds and one reverse speed. A planetary gear train is connected between an input shaft Input and an output shaft Output. The planetary gear train includes a first planetary gear set GS1 composed of first and second planetary gears (or planetary gear units) G1 and G2; and a second planetary gear set GS2 composed of third and fourth planetary gears (or planetary gear units) G3 and G4. The planetary gears G1~G4 are arranged in the order of G1, G2, G3 and G3, from the input shaft's side (the left side in FIG. 1) to the output shaft's side (the right side). A friction engagement device group includes clutches C1, C2 and C3 and brakes B1, B2, B3 and B4. There are further provided one-way clutches F1, F2 and F3.

First planetary gear G1 is a single pinion planetary gear including, as active rotating elements, a first sun gear S1, a first ring gear R1 and a first planet carrier PC1 supporting first pinions P1 engaging with both gears S1 and R1. Second planetary gear G1 is a single pinion planetary gear including, as active rotating elements, a second sun gear S2, a second ring gear R2 and a second planet carrier PC2 supporting second pinions P2 engaging with both gears S2 and R2. Third planetary gear G3 is a single pinion planetary gear including, as active rotating elements, a third sun gear S3, a third ring gear R3 and a third planet carrier PC3 supporting third pinions P3 engaging with both gears S3 and R3. Fourth planetary gear G4 is a single pinion planetary gear including, as active rotating elements, a fourth sun gear S4, a fourth ring gear R4 and a fourth planet carrier PC4 supporting fourth pinions P4 engaging with both gears S4 and R4.

Input shaft Input is connected with second ring gear R2, and arranged to receive a rotational driving force from an engine (not shown) as a prime mover, through a torque converter (TC). Output shaft Output is connected with third carrier PC3, and arranged to deliver an output rotational driving force to drive wheels of a vehicle through a final gear unit.

A first connection member M1 connects first ring gear R1, second carrier PC2 and fourth ring gear R4 so that these elements rotate as a unit. A second connection member M2 connects third ring gear R3 and fourth carrier PC4 so that these elements rotate as a unit. A third connection member M3 connects first sun gear S1 and second sun gear S2 so that these elements rotates as a unit.

First planetary gear set GS1 is formed by connecting first and second planetary gears G1 and G2 with first connection member M1 and third connection member M3. Second planetary gear set GS2 is formed by connecting third and fourth planetary gears G3 and G4 with second connection member M2.

First planetary gear set GS1 has a torque input path for inputting torque from input shaft Input to second ring gear R2. Torque inputted to first planetary gear set GS1 is transmitted to second planetary gear set GS2 by first connection member M1.

Second planetary gear set GS2 has an input torque path for inputting torque from input shaft Input to second connection member M2, and another input torque path for inputting torque from first connection member M1 to fourth ring gear R4. Torque inputted to second planetary gear set GS2 is outputted to output shaft Output from third carrier PC3. When third clutch C3 is disengaged, and the rotating speed of fourth sun gear S4 is higher than the speed of third sun gear, the third and fourth sun gears S3 and S4 rotate at different speeds. Therefore, third and fourth planetary gears G3 and G4 connected by second connection member M2 are arranged to achieve different gear ratios.

First clutch C1 is connected between the input shaft Input and second connection member M2, and arranged to selectively connect and disconnect these members. First clutch C1 can serve as a first clutch device. Second clutch C2 is connected between the fourth sun gear S4 and fourth carrier PC4, and arranged to selectively connect and disconnect these members. Second clutch C2 can serve as a second clutch device. Third clutch C3 is connected between the third sun gear S3 and fourth sun gear S4, and arranged to selectively connect and disconnect these members. Second one-way clutch F2 is connected between third sun gear S3 and fourth sun gear S4. A third clutch device may include only the third clutch C3 or may include the third clutch C3 and second one-way clutch.

First brake B1 is connected between the first carrier PC1 and the stationary transmission housing (H), and arranged to selectively hold first carrier PC1. First one-way clutch F1 is connected, in parallel to first brake B1, between first carrier PC1 and the stationary housing. A first brake device may include only the first brake B1 or may include the first brake B1 and first one-way clutch F1. Second brake B2 is connected between the third sun gear S3 and the stationary member, and arranged to selectively hold third sun gear S3. Second brake B2 can serve as a second brake device. Third brake B3 is connected between the third connection member M3 (rotating as a unit with first and second sun gears S1 and S2) and the stationary member, and arranged to selectively hold third connection member M3 (S1 and S2). Third brake B3 can serve as a third brake device. Fourth brake B4 is connected between the fourth carrier PC4 and the stationary member and arranged to selectively hold fourth carrier PC4. Fourth brake B4 can serve as a fourth brake device. Fifth brake B5 is connected in series with third one-way clutch F3, and the series combination of B5 and F3 is connected in parallel to second brake B2. Fifth brake B5 is arranged to selectively hold the third sun gear S3. Fifth brake B5 can serve as a fifth brake device. The second brake device may include only the second brake B2 or may further include the fifth brake B5 and third one-way clutch F3.

The clutches C1, C2 and C3 and brakes B1, B2, B3, B4 and B5 are connected with a control unit to engage and disengage these devices as shown in an engagement table shown in FIG. 2 to provide at least seven forward speeds and at least one reverse speed, as shown in FIG. 2. In this engagement table, a circle indicates engagement, and no mark means disengagement. This control unit may include a hydraulic unit for producing a hydraulic pressure for engagement and a hydraulic pressure for disengagement, or may be a electronic type, or may be a type including the hydraulic section and the electronic section.

The thus-constructed automatic transmission is operated as follows: FIG. 2 shows the engagement table, and FIG. 3 shows a lever diagram.

First speed is achieved by engaging first brake B1, second brake B2, fifth brake B5 and third clutch C3, as shown in FIG. 2. In this case, first one-way clutch F1 connected in parallel to first brake B1, third one-way clutch F3 connected in series with fifth brake B5, and second one-way clutch F2 connected in parallel to third clutch C3 are involved in torque transmission.

In first speed, first brake B1 is engaged. Therefore, first planetary gear set GS1 receives rotation from second ring gear R2, and produces an output rotation of a reduced speed. The rotation of the reduced speed is transmitted by first connection member M1 to fourth ring gear R4. Since second brake B2 and third clutch C3 are engaged, the second planetary gear set GS2 receives the rotation from fourth ring gear R4, reduces the speed, and delivers rotation from third carrier PC3.

Figure 3:
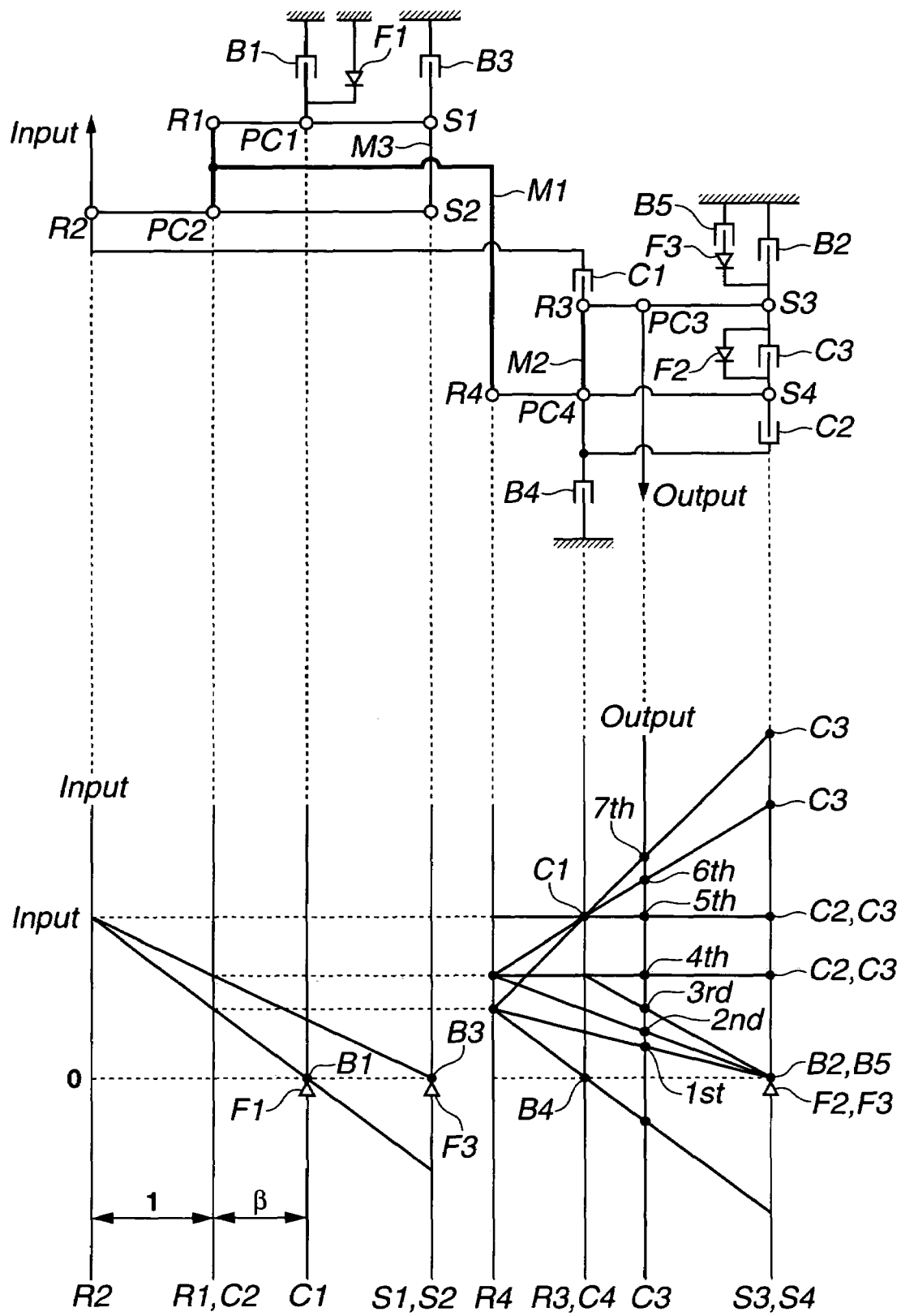
FIG. 3 is a lever diagram showing the rotating states of rotating members in the automatic transmission shown in FIG. 1.

Thus, as shown in FIG. 3, first speed is regulated by a line connecting an engagement point of first brake B1 to reduce the speed of output rotation of the engine, and an engagement point of second brake B2 to reduce the speed of the rotation of the reduced speed from first planetary gear set GS1, and the output rotation of the reduced speed is delivered from output shaft Output.

In the torque flow of first speed, torque acts in first brake B1, second brake B2 (fifth brake B5 and third one-way clutch F3), third clutch C3, first connection member M1, second connection member M2, and third connection member M3. Thus, first planetary gear set GS1 and second planetary gear set GS2 are involved in the torque transmission.

Second speed is achieved by engaging second brake B2, third brake B3, fifth brake B5, and third clutch C3, as shown in FIG. 2. Third one-way clutch F3 in series with fifth brake B5 and second one-way clutch F2 in parallel to third clutch C3 are also involved in torque transmission.

Since third brake B3 is engaged in second speed, the rotation inputted to second ring gear R2 is reduced in speed only by second planetary gear G2. The rotation of the reduced speed is transmitted by first connection member M1 to fourth ring gear R4. Since second brake B2 and third clutch C3 remain engaged, the second planetary gear set GS2 receives the rotation from fourth ring gear R4, reduces the speed, and delivers rotation from third carrier PC3.

Thus, as shown in FIG. 3, second speed is regulated by a line connecting an engagement point of third brake B3 to reduce the speed of output rotation of the engine, and an engagement point of second brake B2 to reduce the speed of the rotation of the reduced speed from second planetary gear G2, and the output rotation of the reduced speed is delivered from output shaft Output.

In the torque flow of second speed, torque acts in third brake B3, second brake B2 (fifth brake B5 and third one-way clutch F3), third clutch C3, first connection member M1, second connection member M2, and third connection member M3. Second planetary gear G2 and second planetary gear set GS2 are involved in the torque transmission.

In an upshift from first speed to second speed, first brake B1 is released earlier and the engagement of third brake B3 is started. When the engagement capacity of third brake B3 is increased sufficiently, first one-way clutch F1 is released. In this way, it is possible to improve the accuracy of shift timing.

Third speed is achieved by engaging third brake B3, second brake B2, fifth brake B5, and second clutch C2, as shown in FIG. 2. Third one-way clutch F3 in series with fifth brake B5 is involved in torque transmission.

Since third brake B3 is engaged in third speed, the rotation inputted to second ring gear R2 is reduced in speed by second planetary gear G2. The rotation of the reduced speed is transmitted by first connection member M1 to fourth ring gear R4. Since second clutch C2 is engaged, fourth planetary gear G4 rotates as a unit. Since second brake B2 is engaged, the rotation inputted to third ring gear R3 through second connection member M2 from the fourth carrier PC4 rotating with fourth ring ge3ar R4 is reduced in speed by third planetary gear G3, and delivered from third carrier PC3. Thus, fourth planetary gear G4 is involved in the torque transmission, but fourth planetary gear G4 is not involved in the speed reduction.

As shown in FIG. 3, third speed is regulated by a line connecting an engagement point of third brake B3 to reduce the speed of output rotation of the engine, and an engagement point of second brake B2 to reduce the speed of the rotation of the reduced speed from second planetary gear G2, and the output rotation of the reduced speed is delivered from output shaft Output.

In the torque flow of third speed, torque acts in third brake B3, second brake B2 (fifth brake B5 and third one-way clutch F3), second clutch C2, first connection member M1, second connection member M2, and third connection member M3. Second planetary gear G2 and second planetary gear set GS2 are involved in the torque transmission.

In an upshift from second speed to third speed, third clutch C3 is released earlier and the engagement of second clutch C2 is started. When the engagement capacity of second clutch C2 is increased sufficiently, second one-way clutch F2 is released. In this way, it is possible to improve the accuracy of shift timing.

Fourth speed is achieved by engaging third brake B3, second clutch C2, and third clutch C3, as shown in FIG. 2.

Since third brake B3 is engaged in fourth speed, the rotation inputted to second ring gear R2 is reduced in speed only by second planetary gear G2. The rotation of the reduced speed is transmitted by first connection member M1 to fourth ring gear R4. Since second clutch C2 and third clutch C3 are engaged, the second planetary gear set GS2 rotates as a unit. Therefore, the rotation inputted to fourth ring gear R4 is delivered directly from third carrier PC3.

As shown in FIG. 3, fourth speed is regulated by a line connecting an engagement point of third brake B3 to reduce the speed of output rotation of the engine, and an engagement point of second and third clutches C2 and C3 to transmit the rotation of the reduced speed from second planetary gear G2, directly to the output shaft Output. The input rotation inputted from input shaft Input is reduced in speed, and delivered from output shaft Output.

In the torque flow of fourth speed, torque acts in third brake B3, second clutch C2, third clutch C3, first connection member M1, second connection member M2, and third connection member M3. Second planetary gear G2 and second planetary gear set GS2 are involved in the torque transmission.

In an upshift from third speed to fourth speed, second brake B2 is released earlier and the engagement of third clutch C3 is started. When the engagement capacity of third clutch C3 is increased sufficiently, third one-way clutch F3 is released. In this way, it is possible to improve the accuracy of shift timing.

Fifth speed is achieved by engaging first clutch C1, second clutch C2, and third clutch C3, as shown in FIG. 2.

Since first clutch C1 is engaged in fifth speed, the rotation is inputted from input shaft Input to second connection member M2. Since second and third clutches C2 and C3 are engaged, third planetary gear G3 rotates as a unit. Therefore, the rotation from input shaft Input is delivered directly from the output shaft Output.

As shown in FIG. 3, fifth speed is regulated by a line connecting an engagement point of first clutch C1 to transmit the output rotation of the engine directly, and an engagement point of second and third clutches C2 and C3. The input rotation inputted from input shaft Input is delivered without speed change, from output shaft Output.

In the torque flow of fifth speed, torque acts in first clutch C1, second clutch C2, third clutch C3, and second connection member M2. Only third planetary gear G3 is involved in the torque transmission.

Sixth speed is achieved by engaging first clutch C1, third clutch C3, and third brake B3, as shown in FIG. 2.

Since first clutch C1 is engaged in sixth speed, the rotation is inputted from input shaft Input to second ring gear R2, and to second connection member M2. Since third brake B3 is engaged, the rotation of the speed reduced by second planetary gear G2 is inputted from first connection member M1 to fourth ring gear R4. Since third clutch C3 is engaged, second planetary gear set GS2 delivers from third carrier PC3, the rotation determined by the rotation of fourth ring gear R4, and the rotation of second connection member M2.

As shown in FIG. 3, sixth speed is regulated by a line connecting engagement points of first clutch C1 and third clutch C3. The output rotation of the increased speed is delivered from third carrier PC3.

In the torque flow of sixth speed, torque acts in first clutch C1, third clutch C3, third brake B3, first connection member M1, second connection member M2 and third connection member M3. The second planetary gear G2 and second planetary gear set GS2 are involved in the torque transmission.

Seventh speed is achieved by engaging first clutch C1, third clutch C3, and first brake B1 (first one-way clutch F1), as shown in FIG. 2.

Since first clutch C1 is engaged in sixth speed, the rotation is inputted from input shaft Input to second ring gear R2, and to second connection member M2. Since first brake B1 is engaged, the rotation of the speed reduced by first planetary gear set GS1 is inputted from first connection member M1 to fourth ring gear R4. Since third clutch C3 is engaged, second planetary gear set GS2 delivers, from third carrier PC3, the rotation determined by the rotation of fourth ring gear R4, and the rotation of second connection member M2.

As shown in FIG. 3, seventh speed is regulated by a line connecting engagement points of first brake B1 to reduce the engine rotation speed by the first planetary gear set G1, first clutch C1 to transmit the engine rotation directly to second connection member M2, and third clutch C3 to form the second planetary gear set GS2. The output rotation of the increased speed is delivered from third carrier PC3.

In the torque flow of seventh speed, torque acts in first clutch C1, third clutch C3, first brake B1, first connection member M1, second connection member M2 and third connection member M3. The first planetary gear set GS1 and second planetary gear set GS2 are involved in the torque transmission.

Reverse speed is achieved by engaging third clutch C3, first brake B1, and fourth brake B4, as shown in FIG. 2.

Since first brake B1 is engaged in reverse speed, the rotation reduced in speed by first planetary gear G1 is inputted from first connection member M1 to fourth ring gear R4. Since third clutch C3 is engaged and fourth brake B4 is engaged, second planetary gear set GS2 delivers, from third carrier PC3, the rotation determined by the rotation of fourth ring gear R4, and the holding of second connection member M2.

As shown in FIG. 3, reverse speed is regulated by a line connecting engagement points of first brake B1 to reduce the engine rotation speed by the first planetary gear set G1, fourth brake B4 to hold the second connection member M2, and third clutch C3 to form the second planetary gear set GS2. The output rotation of the reduced speed in the reverse rotational direction is delivered from third carrier PC3.

In the torque flow of reverse speed, torque acts in third clutch C3, first brake B1, fourth brake B4, first connection member M1, second connection member M2 and third connection member M3. The first planetary gear set GS1 and second planetary gear set GS2 are involved in the torque transmission.

FIGS. 4A, 4B and 4C show three examples of gear ratios and step ratios in the automatic transmission shown in FIG. 1. In tables shown in FIGS. 4A, 4B and 4C, $\alpha 1$ is a gear ratio of first planetary gear G1, $\alpha 2$ is a gear ratio of second planetary gear G2, $\alpha 3$ is a gear ratio of third planetary gear G3, $\alpha 4$ is a gear ratio of fourth planetary gear G4. Each table shows the gear ratio values of the seven forward speeds and the reverse speed, and values of the step ratio between the gear ratio value of one speed and the gear ratio value of another speed when the gears ratios $\alpha 1$, $\alpha 2$, $\alpha 3$ and $\alpha 4$ of first, second, third and fourth planetary gears G1, G2, G3 and G4 are set as shown in the table. The gear ratio $\alpha$ of each planetary gear G1, G2, G3 or G4 is the ratio determined by dividing the number of teeth of the sun gear by the number of teeth of the ring gear.

FIG. 5 shows a ratio coverage obtainable by the automatic transmission show in FIG. 1. The ratio coverage is a quotient obtained by dividing the gear ratio of first speed by the gear ratio of seventh speed, and is used as a quantity representing the range within which the gear ratio can be varied. In FIG. 5, RC1~RC8 are ratio coverage characteristics determined in the following manner.

First ratio coverage characteristic RC1 is determined by fixing the gear ratios $\alpha 2$, $\alpha 3$ and $\alpha 4$ of the three planetary gears G2, G3 and G4 at a maximum value ($\alpha$=0.63), and by varying the gear ratio $\alpha 1$ of first planetary gear G1. Second ratio coverage characteristic RC2 is determined by fixing the gear ratios $\alpha 2$, $\alpha 3$ and $\alpha 4$ of the three planetary gears G2, G3 and G4 at a minimum value ($\alpha$=0.37), and by varying the gear ratio $\alpha 1$ of first planetary gear G1.

Third ratio coverage characteristic RC3 is determined by fixing the gear ratios $\alpha 1$, $\alpha 3$ and $\alpha 4$ of the three planetary gears G1, G3 and G4 at the maximum value ($\alpha$=0.63), and by varying the gear ratio $\alpha 2$ of second planetary gear G2. Fourth ratio coverage characteristic RC4 is determined by fixing the gear ratios $\alpha 1$, $\alpha 3$ and $\alpha 4$ of the three planetary gears G1, G3 and G4 at the minimum value ($\alpha$=0.37), and by varying the gear ratio $\alpha 2$ of second planetary gear G2.

Fifth ratio coverage characteristic RC5 is determined by fixing the gear ratios $\alpha 1$, $\alpha 2$ and $\alpha 4$ of the three planetary gears G1, G2 and G4 at the maximum value ($\alpha$=0.63), and by varying the gear ratio $\alpha 3$ of third planetary gear G3. Sixth ratio coverage characteristic RC6 is determined by fixing the gear ratios $\alpha 1$, $\alpha 2$ and $\alpha 4$ of the three planetary gears G1, G2 and G4 at the minimum value ($\alpha$=0.37), and by varying the gear ratio $\alpha 3$ of third planetary gear G3.

Seventh ratio coverage characteristic RC7 is determined by fixing the gear ratios $\alpha 1$, $\alpha 2$ and $\alpha 3$ of the three planetary gears G1, G2 and G3 at the maximum value ($\alpha$=0.63), and by varying the gear ratio $\alpha 4$ of fourth planetary gear G4. Eighth ratio coverage characteristic RC8 is determined by fixing the gear ratios $\alpha 1$, $\alpha 2$ and $\alpha 3$ of the three planetary gears G1, G2 and G3 at the minimum value ($\alpha$=0.37), and by varying the gear ratio $\alpha 4$ of fourth planetary gear G4.

The automatic transmission shown in FIG. 1 is advantageous in the following points. (1) Inside first and second sun gears S1 and S2 of first planetary gear set GS1, there is provided only the input shaft Input. Therefore, there is no need to employ a multi-shaft structure. The single-shaft arrangement including only the input shaft on the radial inner side of the sun gears S1 and S2 is effective for preventing an increase in the outside diameter of the whole system, and at the same time for ensuring the sufficient supply of lubricant to the planetary gears, clutches and brakes on the radial outer side. Moreover, the number of required bushes and bearings can be decreased, so that it is possible to facilitate the assembly process, to reduce the friction and to improve the fuel economy.

(2) By employing a simple planetary gear as input planetary gear, it is possible to improve the productivity of carrier, and the positional accuracy of gears, and to prevent an increase in the cost, as compared to a double-pinion type planetary gear.

(3) As shown in FIG. 5, it is possible to increase the ratio coverage to a wide range of 4.99~12.66 (in the case of $\alpha$=0.37~0.63). Therefore, the automatic transmission can be used for a variety of vehicles such as PVs, SUVs and trucks. Moreover, it is possible to use, as a starting device, a device such as a wet clutch.

(4) All the planetary gears are of the simple type without using stepped pinions. The use of step pinions deteriorates the productivity of pinions, increases the cost, tends to deteriorate the accuracy of gears, and causes gear noises. Moreover, the loads on the left and right portions of each pinion are unequal, and in order to compensate for this unbalance, it is required to increase the strengths of carriers and pinion shafts. By the use of the simple planetary gears, it is possible to avoid these problems.

(5) The automatic transmission according to this embodiment can provide two or more of overdrive speeds. Recently, there is a demand for widening the ratio coverage in order to improve the fuel efficiency. Especially in the case of an automatic transmission of six or more forward speeds, if there is only one overdrive speed, the gear ratio of first speed must be set at a greater value in view of the ratio coverage. As a result, the output torque in first speed is increased, and there arises a need for employing a propeller shaft and differential of larger sizes to endure the greater torque, so that the overall size and weight are increased. Moreover, since the first speed is a low speed, it is required to design a structure of a specific final gear ratio, so that it is difficult to use parts for common use. These problems are avoided by providing a plurality of overdrive speeds.

(6) By eliminating third brake B3 and first planetary gear G1, for example, it is possible to produce a five-speed automatic transmission. Moreover, it is possible to attain adequate gear ratios by employing $\alpha 2$, $\alpha 3$ and $\alpha 4$ of the seven-speed automatic transmission in the example shown in FIG. 4A, directly for the five-speed transmission. Therefore, it is possible to use parts in common for both the five speed type and the seven-speed type.

(7) It is possible to restrain the rotational speeds of rotating members and pinions low. Therefore, the automatic transmission according to this embodiment makes it possible to improve the durability and reliability.

A turbine sensor (or input speed sensor) is disposed in the following manner. As shown in FIG. 1, a first rotation sensor TS1 is disposed on a radial outer side of first connection member M1, and arranged to sense the rotation speed N(M1) of first connection member M1. A second rotation sensor TS2 is disposed on a radial outer side of a sensor member 63 serving as a sensed member provided in first carrier PC1, and arranged to sense the rotation speed N(PC1) of first carrier PC1. An automatic transmission controller ATCU has a rotation speed calculating section to determine the rotation speed of input shaft Input from the rotation speeds sensed by the first and second rotation sensors TS1 and TS2. This layout is based on the following reasons.

The automatic transmission of this embodiment has a basic layout as shown in FIG. 7. The automatic transmission of this embodiment includes a pump cover PC (2); a transmission housing H (1) serving as a main part of a stationary member; a stator housing SH on the right side of the planetary gear system GS; a control valve unit CVU disposed under the planetary gear train of G1-G4, and arranged to supply a control hydraulic pressure to each of the engagement devices (C1-C3 and B1-B5); and the above-mentioned automatic transmission controller (or control unit) ATCU disposed between the planetary gear train (G1-G4) on the upper side and the control valve unit CVU on the lower side, as shown in FIG. 7. In this way, the automatic transmission of this embodiment has a so-called electro-mechanical integrated structure. The first and second planetary gears G1 and G2 are combined to form the first planetary gear set GS1, by connecting two (S1, R1) of the three rotating elements (sun gear S1, ring gear R1 and carrier PC1) of first planetary gear G1 with two (PC2, S2) of the three rotating elements (sun gear S2, ring gear R2 and carrier PC2) of second planetary gear G2. In the example shown in FIG. 1, first ring gear R1 and second carrier PC2 are connected together so that they rotate as a unit; and first sun gear S1 and second sun gear S2 are connected together so that they rotate as a unit.

The automatic transmission of this embodiment is arranged to improve the quality of the shift control by sensing the rotational speeds of input shaft Input and output shaft Output accurately, to ascertain the gear ratio accurately during the process of shift operation. To obtain an optimum shift characteristic, the planetary gear train is formed by four planetary gears G1-G4; and input shaft Input is extended, from the left side as viewed in FIG. 1, into the planetary gear train of G1~G4, and connected between the second and third planetary gears G2 and G3. The first connection member M1 connecting one element of second planetary gar G2 with one element of fourth planetary gear G4 surrounds and encloses the second and third planetary gears G2 and G3. In the example of FIG. 1, the first connection member M1 includes an intermediate portion surrounding the second and third planetary gears G2 and G3; a first end portion extending radially inwards from a first (left) end of the intermediate portion into the interspace between the first and second planetary gears G1 and G2, and being connected with second carrier PC2 on the left side of G2 as viewed in FIG. 2; and a second end portion extending from a second (right) end of the intermediate portion and being connected with fourth ring gear R4 on the left side of G4 as viewed in FIG. 1. Therefore, the input shaft Input, and second and third planetary gears G2 and G3 are covered and concealed by the first connection member M1 from the radial outer side.

As shown in FIG. 7, the automatic transmission further includes a torque converter TC, and the input shaft Input connected with this torque converter TC extends axially through pump cover PC (or pump cover 2) into the planetary gear train GS (G1~G4). Output shaft Output is aligned with input shaft at the center of the transmission, and extends through stator housing SH, to the right as viewed in FIG. 5. Input rotation is inputted from input shaft Input to the planetary gear train GS; output rotation is produced at an adequate speed ratio by the planetary gear train GS connected between the input and output shafts; and the output rotation is delivered through output shaft Output. In the automatic transmission having the above-mentioned electro-mechanical integrated structure, it is desirable to dispose the rotation sensors TS1 and TS2 within a region α axially between pump cover PC and stator housing SH, as shown in FIG. 7, in order to facilitate the connection between the rotation sensors TS1 and TS2 and the controller ATCU by sensor harnesses SH of the rotation sensors TS1 and TS2.

However, the input shaft Input is located at the center of the automatic transmission, and the rotating members rotating at the same speed as input member Input are covered by first connection member M1. Therefore, it is practically impossible to sense the input speed of input shaft Input directly.

First and second sun gears S1 and S2 are rotating elements held by third brake B3. Therefore, it is necessary to ensure a path for connection with the transmission housing H (or 1).

(1) The third connection member M3 connecting first and second sun gears S1 and S2 is located on the radial inner side of first and second sun gears S1 and S2, so that it is not easy to provide a path extending radially outwards. (2) It is possible to employ an arrangement in which a turbine sensor is inserted axially through the pump cover PC (or 2). However, in this possible arrangement, to open a through hole for inserting the turbine sensor in pump cover is not desirable since the pump cover 2 must support input shat Input, and serve as a reaction member for receiving a reactive force of another engaging device (first brake B1 and second brake B2). (3) Moreover, the pump cover 2 separates a dry chamber requiring no lubrication on the torque converter's side (that is, the left side as viewed in FIG. 7) and a wet chamber requiring lubrication on the planetary gear train's side (that is, the right side in FIG. 7). Therefore, the through hole for the turbine sensor requires the addition of a seal, so that the number of parts is increased. (4) In the case of the electro-mechanical integrated structure, if the first and second rotation sensors TS1 and TS2 are spaced apart, this arrangement makes it difficult to arrange the harnesses, and tends to make complicated the assembly operation.

Therefore, in this embodiment, attention is directed to the arrangement in which input shaft Input is connected with second ring gear R2, and the first and second planetary gears G1 and G2 are connected to form the first planetary gear set GS1 by connecting two elements of first planetary gear G1 with two elements of second planetary gear G2. The input speed calculating section in ATCU is configured to calculate the input speed of input shaft Input by using the two rotation sensors TS1 and TS2. In this example, the input rotation is calculated by using the following equation.

$$N(R2)=(1+1/\beta)\cdot N(PC2)-(1/\beta)\cdot N(PC1)$$

In this equation, N(PC1) is the rotation speed of first carrier PC1; N(PC2) is the rotation speed of second carrier PC2; N(R2) is the rotation speed of second ring gear R2; the gear ratio of the second ring gear R2 and second carrier PC2 (first ring ger R1) is equal to one as shown in the lever diagram of FIG. 3; and the gear ratio of first ring gear R1 (second carrier PC2) and first carrier PC1 is equal to β (beta).

The first rotation sensor TS1 is arranged to sense the rotation speed N(PC2) of second carrier PC2; and the second rotation sensor TS2 is arranged to sense the rotation speed N(PC1) of first carrier PC1 by sensing the rotation of the sensor member 63 as a turbine sensor member TSM, connected with first carrier PC1. By using the rotation speeds N(PC2) and N(PC1) thus sensed by the first and second rotation sensors TS1 and TS2, respectively, the input speed calculating section calculates the rotation speed of second ring gear R2 (that is, the rotation speed of input shaft Input) according to the above-mentioned equation.

Figure 6:
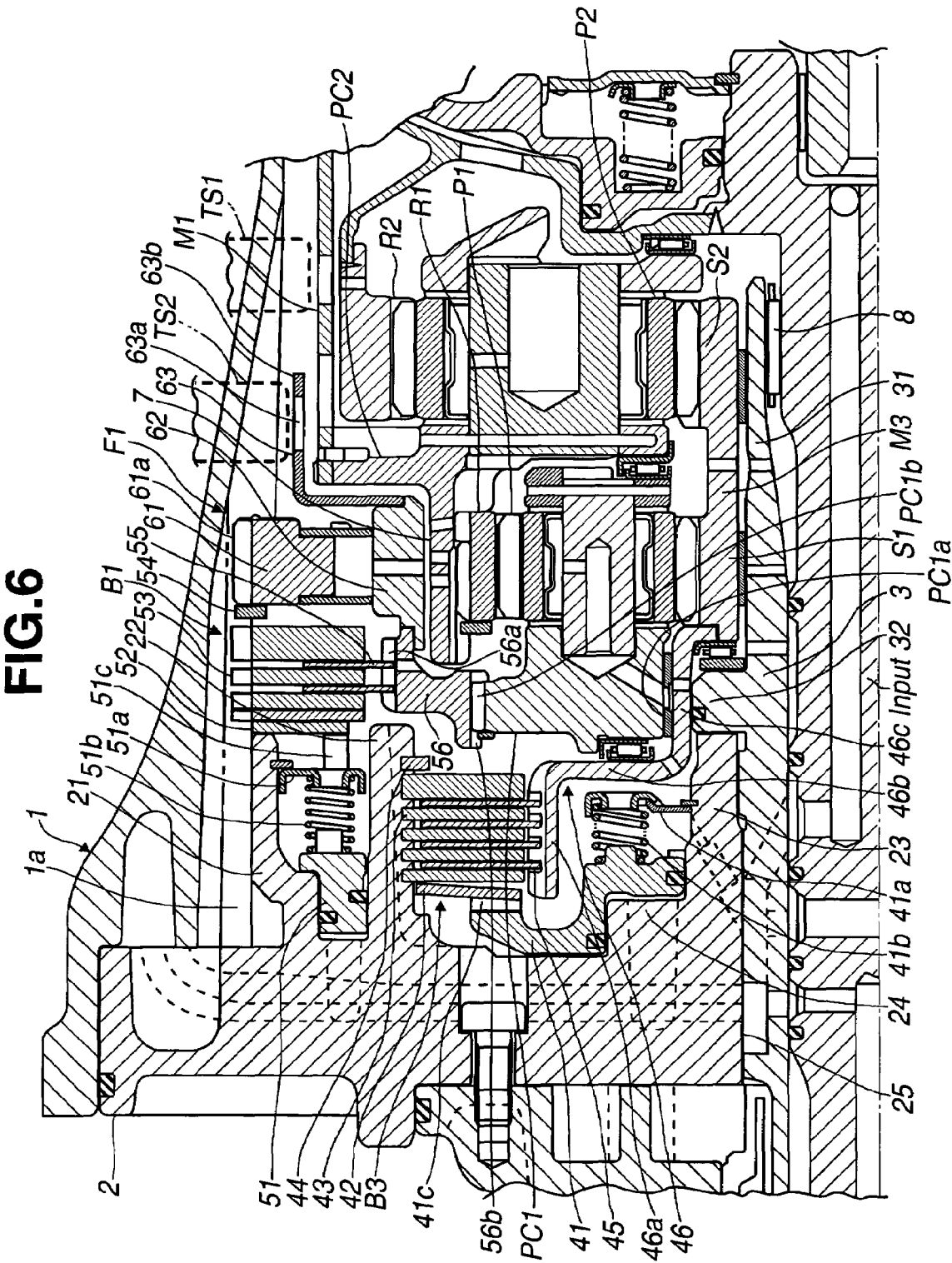
FIG. 6 is a sectional view showing a part of the automatic transmission in an practical example according to this embodiment.

FIG. 6 shows the construction around first and second rotation sensors TS1 and TS2 more in detail in the example according to this embodiment. Though the first and second rotation sensors TS1 and TS2 are placed on the upper part of the transmission unit in FIG. 6 for facilitating the explanation, the first and second rotation sensors TS1 and TS2 are placed in practice in the lower part of the transmission unit as shown in FIG. 7. More specifically, the first and second rotation sensors TS1 and TS2 are placed between the transmission unit (or the planetary gear train) and the control valve unit CVU, in the vicinity of the transmission controller ATCU. In FIG. 6, the control valve unit CVU is omitted for simplification.

A transmission housing 1 is formed, near an input side opening, with splines 1a for engaging with clutch plates 53 of first brake B1, and an outer race 61 of first one-way clutch C1. A pump cover 2 is fixed in the input side opening of transmission housing 1. Pump cover 2 includes first, second and third cylindrical portions 21, 22 and 23 projecting toward the output side (the right side as viewed in FIG. 6). The first cylindrical potion 21 is located on the radial outer side of second cylindrical portion 22, and the third cylindrical portion 23 is located on the radial inner side of second cylindrical portion 22. Second cylindrical portion 22 is located radially between first and third cylindrical portions 21 and 23. Third cylindrical portion 23 is formed with a stepped portion 24 which bulges radially outwards and thereby increases the wall thickness of third cylindrical portion 23 partly. The third cylindrical portion 23 is formed with a central support hole 25.

Between first and second cylindrical portions 21 and 22 of pump cover 2, there is disposed a piston 51 of first brake B1, and there is formed a hydraulic piston pressure chamber. On the radial inner side of first cylindrical portion 21, there are provided a spring 51b for urging piston 51 toward pump cover 2, and a spring retainer 51 for holding this spring 51b.

Second cylindrical portion 22 is formed, on the radial inner side, with splines engaging with clutch plates 43 of third brake B3 so that the clutch plates 43 can slide axially. These clutch plates 43 and clutch plates 45 are arranged alternately to form an alternating clutch plate pack. Clutch plates 45 are engaged with a third brake hub 46. A snap ring 44 limits the axial movement of the clutch plate pack, and retains the clutch plate pack axially. A disc spring 42 is disposed at the end of the clutch plate pack on the pump cover's side. The clutch plate pack is located axially between disc spring 42 and snap ring 44.

A piston 41 of third brake B3 is disposed radially between second cylindrical portion 22 and third cylindrical portion 23. Piton 41 has a bent form, and includes an outer portion surrounding the stepped portion 24 and fitting over the stepped portion 24 in a slidable and liquid-tight manner, and an inner portion fitting over the third cylindrical portion 23 in the slidable and liquid-tight manner. A hydraulic piston pressure chamber is formed between the stepped portion 24 and the inner portion of piston 41.

A spring 41b is arranged to urge piston 41 toward pump cover 2. A spring retainer 41a is a member for supporting spring 41b. Spring 41b and its retainer 41a are disposed radially between second and third cylindrical portions 22 and 23.

A stator shaft 3 is forcibly fit and fixed in the center support hole 25 formed in the third cylindrical portion 23. This stator shaft 3 has an outward projecting portion 32 projecting outwards like a flange. The pump cover 2 and stator shaft 3 are positioned relative to each other by abutting the projecting end of third cylindrical portion 23 axially against the side of the outward projecting portion 32 of stator shaft 3. The stator shaft 3 includes a sun gear support portion 31 projecting axially beyond the outward projecting portion 32, toward the output side, and supporting the third connection member M3 rotatably. Third connection member M3 is rotatably mounted on the sun gear support portion 31. Stator shaft 3 is a hollow shaft, and the input shaft Input is rotatably received in the stator shaft 3. A needle bearing 8 is disposed radially between the inside circumferential surface of sun gear support portion 31 and the outside circumferential surface of input shaft Input, to support input shaft Input rotatably.

A third brake hub 46 of third brake B3 is connected with first sun gear S1 of first planetary gear G1. Third brake B3 is connected between first sun gear S1 (third connection member M3) and the stationary transmission housing 1. This third brake hub 46 includes an inner cylindrical portion 46c disposed radially between the outward projecting portion 32 of stator shaft 3, and the first carrier PC1; a radially extending portion 46b extending radially outwards from the input side end of the inner cylindrical portion 46c on the left (input) side of first carrier PC1; and a splined portion 46a projecting from an outer end of the radially extending portion 46b to the left (input) side.

First carrier PC1 of first planetary gear G1 includes an inner portion PC1a slidably mounted on the cylindrical portion 46c of third brake hub 46 through a bush; and an outer portion PC1b formed with splines. A first brake hub 56 is mounted on and splined with the first carrier PC1. First brake hub 56 includes an internal splined portion 56b splined with the external splined outer portion PC1b of first carrier PC1; and an outer splined portion 56a engaging with clutch plates 55 of first brake B1. Inner race 62 of first one-way clutch F1 is fixed with the right (output shaft's) side end of first brake hub 56.

First ring gear R1 of first planetary gear G1 includes a splined outer circumference engaging with a connection member 7 extending from second carrier PC2 toward the input side (left side in FIG. 6). Second carrier PC2 is connected with the first connection member M1 at a position which is on the radial outer side of second planetary gear G2, and which is axially between first and second planetary gears G1 and G2.

First one-way clutch F1 includes an outer race 61 which includes an external splined portion 61 engaging with the internal splined portion 1a of the transmission housing 1, and which is fixed axially by a snap ring 54; an inner race 62 connected with first planet carrier PC1 through first brake hub 56, as mentioned before; and a sprag provided between the outer and inner races 61 and 62. The sensor member 63 for the second rotation sensor TS2 is fixed to the right end of the inner race 62 on the output (right) side of first one-way clutch F1. Sensor member 63 includes a circumferential portion 63b extending axially toward the output (right) side and surrounding first connection member M1 so as to overlap first connection member M1. The circumferential portion 63b is formed with a plurality of through holes 63a arranged at regular angular intervals in the circumferential direction around the center line of the transmission. Second rotation sensor TS2 is arranged to sense the rotation speed of first carrier PC1 by sensing the frequency of magnetic field variation due to the movement of through holes 63a. In the example shown in FIG. 6, sensor member 63 includes the circumferential portion 63b which is cylindrical, and a flat annular portion extending radially inward from the left (input side) end of the circumferential portion 63b to a lower end which is fixed to the right (output side) end of the inner race 62.

According to the illustrated embodiment, the second rotation sensor TS2 is arranged to sense the rotation of a rotating member (56, 62, 63) connected with the carrier PC1 of the first planetary gear G1. This rotating member (56, 62, 63) includes a first portion (56) which is located axially between third brake B3 and the first planetary gear G1, and which is surrounded by (the clutch plate pack 55 and 56 of) first brake B1; a second portion (62) surrounding the first planetary gear G1, and a third portion (63) surrounding the first connection member M1. Thus the rotating member extends from the input side (left side) of first planetary gear G1 to the output side (right side) of first planetary gear G1. The second rotation sensor TS2 is located on the radial outer side of the third portion (63) of the rotating member. In the example shown in FIG. 6; the brake hub 56 of first brake B1 can serve as the first portion of the rotating member; the inner race 62 of first one-way clutch F1 can serve as the second portion of the rotating member; and the sensor member 63 can serve as the third portion of the rotating member.

The thus-constructed automatic transmission according to the embodiment is advantageous in the following points.

(1) First and second rotation sensors TS1 and TS2 are arranged to sense the two different rotation speeds of two elements of the first planetary gear set GS1 composed of first and second planetary gears G1 and G2; and the controller (ATCU) is configured to calculate the input speed of input shaft Input from the two different rotation speeds sensed by the first and second rotation sensors TS1 and TS2. Therefore, the input speed can be sensed even if it is difficult to sense the rotation of input shaft Input directly. By sensing the rotation of the first carrier PC1 instead of sensing the rotation of the first sun gear S1, the automatic transmission of this embodiment can solve the before-mentioned problems (1)~(4).

Third brake B3 is disposed in the pump cover 2 on the input side, and the first brake B1 is located on the output (right) side of third brake B3. Therefore, the path for taking out the rotation from the first carrier PC1 to the second rotation sensor TS2 can be formed between the third brake B3 for holding the first sun gear S1 to the pump cover 2 and the first planetary gear G1.

The first brake B1 is located on the radial outer side of third brake B3, and the piston 51 of first brake B1 surrounds the third brake B3. As shown in FIG. 2, the third brake B3 is engaged for the second, third, fourth and sixth speeds, and not used for the first speed requiring a higher torque for starting, for example. That is, the third brake B3 does not require a great engagement capacity, and therefore, the third brake B3 is disposed on the radial inner side closer to the center axis. On the other hand, the first brake B1 is engaged for the first, seventh and reverse speeds. Therefore, the first brake B1 is disposed on the radial outer side, and the first brake B1 includes larger clutch plates having a larger diameter, for greater engagement capacity.

The piston 51 is disposed around third brake B3. Therefore, it is possible to reduce the axial length of the automatic transmission. Moreover, the first brake B1 and first one-way clutch F1 are disposed around the first planetary gear G1. Therefore, it is possible to reduce the axial length and increase the engagement capacity.

First one-way clutch F1 is disposed around first planetary gear G1, and the sensor member 63 is located on the output side of first one-way clutch F1, around the first connection member M1. With this arrangement, it is possible to arrange the first and second rotation sensors TS1 and TS2 side by side close to each other. This arrangement is advantageous for layout of harnesses for the sensors, and the assembly operation.

The hydraulic pressure chambers or piston chambers of third brake B3 and first brake B1 are both formed in pump cover 2. By forming oil passages in the pump cover 2, the operating oil can be supplied readily to these pressure chambers from the control valve unit.

This application is based on a prior Japanese Patent Application No. 2005-152272 filed on May 25, 2005. The entire contents of this Japanese Patent Application No. 2005-152272 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
    a planetary gear train including first, second, third and fourth planetary gears arranged in order of mention from an input shaft's side toward an output shaft's side, the first and second planetary gears being combined to form a planetary gear set in which two of three rotating elements of the first planetary gear are connected, respectively, with two of three rotating elements of the second planetary gear;
    an input rotation member which extends from an input shaft radially outwards between the second and third planetary gears and which is connected with a ring gear of the second planetary gear;
    a first connection member including a first end portion connected with a carrier of the second planetary gear between the first and second planetary gears, a second end portion connected with a ring gear of the fourth planetary gear, and an intermediate portion surrounding the second and third planetary gears;
    an engaging device group to determine a gear ratio of the planetary gear train;
    a first rotation sensor to sense a rotation speed of a first rotary member which is the first connection member;
    a second rotation sensor to sense a rotating speed of a second rotary member which is a rotating element of the planetary gear set and which is arranged to rotate at a speed different from the rotating speed of the first connection member; and
    a processing section to calculate a rotation speed of the input shaft from the rotating speeds sensed by the first and second rotation sensors.

2. The automatic transmission as claimed in claim 1, wherein the automatic transmission further comprises a control valve unit disposed under the planetary gear train and constructed to produce a hydraulic pressure for the engaging device group, and a controller disposed between the planetary gear train and the control valve unit, and configured to produce a control signal to control the control valve unit.

3. The automatic transmission as claimed in claim 1, wherein
    the first planetary gear is a single pinion planetary gear including, as three rotating elements, a first sun gear, a first ring gear and a first planet carrier supporting a pinion engaging with the first sun gear and the first ring gear;
    the second planetary gear is a single pinion planetary gear including, as three rotating elements, a second sun gear, a second ring gear and a second planet carrier supporting a pinion engaging with the second sun gear and the second ring gear, the second planetary gear being located axially between the first and third planetary gears;
    the third planetary gear is a single pinion planetary gear including, as three rotating elements, a third sun gear, a third ring gear and a third planet carrier supporting a pinion engaging with the third sun gear and the third ring gear, the third planetary gear being located axially between the second and fourth planetary gears;

the fourth planetary gear is a single pinion planetary gear including, as three rotating elements, a fourth sun gear, a fourth ring gear and a fourth planet carrier supporting a pinion engaging with the fourth sun gear and the fourth ring gear;

the first connection member connects the first ring gear, the second carrier, and the fourth ring gear so that they rotate as a unit;

the automatic transmission further comprises a second connection member connecting the third ring gear and the fourth carrier so that they rotate as a unit;

the automatic transmission further comprises a third connection member connecting the first sun gear and the second sun gear so that they rotate as a unit; and the third carrier is connected with an output shaft.

4. The automatic transmission as claimed in claim 3, wherein the engaging device group comprises:
   a first clutch device arranged to selectively connect and disconnect the second ring gear and the third ring gear;
   a second clutch device arranged to selectively connect and disconnect the fourth carrier and the fourth sun gear;
   a third clutch device arranged to selectively connect and disconnect the third sun gear and the fourth sun gear;
   a first brake device arranged to selectively hold the first carrier;
   a second brake device arranged to selectively hold the third sun gear;
   a third brake device arranged to selectively hold the third connection member; and
   a fourth brake device arranged to selectively hold the second connection member.

5. The automatic transmission as claimed in claim 4, wherein the automatic transmission further comprises a shift control section configured to achieve:
   a first forward speed by engaging the third clutch device, the first brake device and the second brake device,
   a second forward speed by engaging the third clutch device, the second brake device and the third brake device,
   a third forward speed by engaging the second clutch device, the second brake device and the third brake device,
   a fourth forward speed by engaging the second clutch device, the third clutch device and the third brake device,
   a fifth forward speed by engaging the first clutch device, the second clutch device and the third clutch device,
   a sixth forward speed by engaging the first clutch device, the third clutch device and the third brake device,
   a seventh forward speed by engaging the first clutch device, the third clutch device and the first brake device, and
   a reverse speed by engaging the third clutch, the first brake device and the fourth brake device.

6. The automatic transmission as claimed in claim 4, wherein the third brake is disposed on an input side of the planetary gear train, and the first brake device is disposed on an output side of the third brake device.

7. The automatic transmission as claimed in claim 6, wherein the first brake device includes a piston surrounding the third brake device, and a clutch plate pack located on a radial outer side of the first planetary gear.

8. The automatic transmission as claimed in claim 4, wherein:

the first brake device comprises a first brake to selectively hold the first carrier, and a one-way clutch connected in parallel to the first brake, which is arranged to allow rotation of the first carrier only in one direction, and which is located on a radial outer side of the first planetary gear; and the automatic transmission further comprises a sensor member which is located on an output side of the one-way clutch, and which includes a portion extending on the radial outer side of the first connection member, the second rotation sensor being arranged to sense a rotation speed of the sensor member.

9. The automatic transmission as claimed in claim 8, wherein the sensor member is connected with the first carrier of the first planetary gear.

10. The automatic transmission as claimed in claim 4, wherein the automatic transmission further comprises a pump cover located on the input side of the planetary gear train and arranged to define a hydraulic pressure chamber for the first brake device and a hydraulic pressure chamber for the third brake device.

11. The automatic transmission as claimed in claim 4, wherein the second rotation sensor is arranged to sense the rotation speed of the carrier of the first planetary gear.

12. The automatic transmission as claimed in claim 11, wherein the automatic transmission further comprises a rotating member connected with the carrier of the first planetary gear; the second rotation sensor is arranged to sense the rotation speed of the rotating member; the rotating member includes a first portion which is located axially between the third brake device and the first planetary gear and which is surrounded by the first brake device, a second portion surrounding the first planetary gear, and a third portion surrounding the first connection member.

13. The automatic transmission as claimed in claim 2, wherein the first and second rotation sensors are disposed between the planetary gear train and the control valve unit.

14. An automatic transmission comprising:
   a planetary gear train including first, second, third and fourth planetary gears, the second and third planetary gears being located axially between the first and fourth planetary gears, the second planetary gear being located axially between the first and third planetary gears;
   an input shaft which is enclosed by the first planetary gear and which is connected with a ring gear of the second planetary gear member by an input rotation member extending between the second and third planetary gears;
   a first connection member including a first end portion connected with a planet carrier of the second planetary gear between the first and second planetary gears, a second end portion connected with a ring gear of the fourth planetary gear, and an intermediate portion surrounding the second and third planetary gears;
   a first rotation sensor to sense a rotation speed of the first connection member;
   a second rotation sensor to sense a rotating speed of a carrier of the first planetary gear; and
   a processing section to calculate an input speed of the input shaft from the rotating speeds sensed by the first and second rotation sensors.

* * * * *